US008697764B2

(12) United States Patent
Ulanova et al.

(10) Patent No.: US 8,697,764 B2
(45) Date of Patent: Apr. 15, 2014

(54) ELASTIC INORGANIC-ORGANIC HYBRID FOAM

(75) Inventors: Tatiana Ulanova, Ludwigshafen (DE); Klaus Hahn, Kirchheim (DE); Christof Möck, Mannheim (DE); Armin Alteheld, Bad Kreuznach (DE); Hans-Joachim Hähnle, Neustadt (DE); Meik Ranft, Bensheim-Hochstädten (DE); Christof Kujat, Neustadt (DE)

(73) Assignee: BASF SE (DE)

( * ) Notice: Subject to any disclaimer, the term of this patent is extended or adjusted under 35 U.S.C. 154(b) by 347 days.

(21) Appl. No.: 12/989,489

(22) PCT Filed: Apr. 27, 2009

(86) PCT No.: PCT/EP2009/055020
§ 371 (c)(1), (2), (4) Date: Oct. 25, 2010

(87) PCT Pub. No.: WO2009/133046
PCT Pub. Date: Nov. 5, 2009

(65) Prior Publication Data
US 2011/0049411 A1    Mar. 3, 2011

(30) Foreign Application Priority Data

Apr. 29, 2008   (EP) .................................... 08155369

(51) Int. Cl.
*C08K 7/10* (2006.01)
*C08K 7/08* (2006.01)
*C08K 3/36* (2006.01)

(52) U.S. Cl.
USPC ........................................ 521/91; 428/312.6

(58) Field of Classification Search
USPC .......................................................... 521/91
See application file for complete search history.

(56) References Cited

U.S. PATENT DOCUMENTS

| | | | |
|---|---|---|---|
| 3,737,332 A | 6/1973 | Sennett et al. | |
| 3,864,137 A | 2/1975 | Van Bonin et al. | |
| 3,878,278 A | 4/1975 | Miller et al. | |
| 4,136,241 A * | 1/1979 | Ammann | 521/163 |
| 4,185,147 A * | 1/1980 | Blount | 521/154 |
| 4,464,486 A | 8/1984 | Kramer et al. | |
| 4,533,490 A | 8/1985 | Kluth et al. | |
| 6,352,679 B1 * | 3/2002 | Shibasaki et al. | 423/335 |
| 7,026,044 B2 | 4/2006 | Braun et al. | |
| 2005/0070616 A1 * | 3/2005 | Champ et al. | 521/50 |
| 2008/0300329 A1 | 12/2008 | Fechtenkötter et al. | |
| 2010/0127203 A1 | 5/2010 | Ulanova et al. | |

FOREIGN PATENT DOCUMENTS

| | | |
|---|---|---|
| DE | 1188797 B * | 3/1965 |
| DE | 2165912 A1 | 7/1973 |
| DE | 2227147 A1 | 2/1974 |
| DE | 2520079 A1 | 11/1975 |
| DE | 3244523 A1 | 6/1984 |
| DE | 102004006563 A1 | 9/2005 |
| DE | 102004034604 A1 | 2/2006 |
| EP | 1146070 A2 | 10/2001 |
| FR | 1463369 A | 3/1967 |
| GB | 1175760 * | 12/1969 |
| GB | 1385605 A * | 8/1977 |
| GB | 1504929 A | 3/1978 |
| WO | WO-03/018476 A2 | 3/2003 |
| WO | WO-2007023118 A2 | 3/2007 |
| WO | WO-2007/048729 A1 | 5/2007 |
| WO | WO-2008007187 A2 | 1/2008 |
| WO | WO-2008/132110 A1 | 11/2008 |

OTHER PUBLICATIONS

Bergna, H. "Colloid Chemistry of Silica" in Colloidal Silica: Fundamentals and Applications. Edited by Horacio E . Bergna and William O. Roberts. CRC Press 2005. Print ISBN: 978-0-8247-0967-9. eBook ISBN: 978-1-4200-2870-6.*
Reddy, C.S.; Mahaling, R.M.; Das, C.K. "Particulate-Filled Vinyl Polymer Composites" in Handbook of Vinyl Polymers. Edited by Munmaya K . Mishra and Yusuf Yagci. CRC Press 2008. pp. 499-540.*
Bernemann, P; Maas, G. Machine Translation of DE 1188797B. Mar. 1965.*
Iler, Ralph K. (1979). Chemistry of Silica—Solubility, Polymerization, Colloid and Surface Properties and Biochemistry.. John Wiley & Sons. Online version available at: http://www.knovel.com/web/portal/browse/display?_EXT_KNOVEL_DISPLAY_bookid=1489&VerticalID=0.*
International Preliminary Report on Patentability issued in related International Application No. PCT/EP2009/055020, issued Oct. 5, 2010, and English-language translation thereof.

* cited by examiner

*Primary Examiner* — Randy Gulakowski
*Assistant Examiner* — Christina Wales
(74) *Attorney, Agent, or Firm* — Novak Druce Connolly Bove + Quigg LLP

(57) ABSTRACT

A process for producing an elastic silicate foam by foaming a mixture comprising
10% to 80% by weight of an aqueous dispersion of $SiO_2$ particles A) which have an average particle diameter in the range from 1 to 100 nm,
5% to 30% by weight of a polymer B) in solution in water,
10% to 50% by weight of a blowing agent C),
1% to 5% by weight of an emulsifier D),
0.01% to 5% by weight of a crosslinker E) which is reactive with the polymer B),
and also the foam obtainable by the process, and the use of the foam.

21 Claims, No Drawings

ELASTIC INORGANIC-ORGANIC HYBRID FOAM

CROSS REFERENCE TO RELATED APPLICATIONS

This application is a national stage application under 35 U.S.C. §371 of PCT/EP2009/055020, filed Apr. 27, 2009, which claims benefit to European application 08155369.5, filed Apr. 29, 2008, the entire disclosures of which are hereby incorporated by reference.

The invention relates to a process for producing an elastic silicate foam, and also to the foam obtainable by the process and the use of the foam.

For thermal and acoustic insulation it is common to use organic foams based on polystyrene, polyolefins or polyurethanes. Without addition of flame retardant additives, however, these foams are relatively highly flammable and combustible.

On account of their chemical composition, melamine-formaldehyde foams already possess favorable fire properties. To improve the fire properties, the cell scaffold of open-cell melamine resin foams is impregnated, for example, with an ammonium salt (EP-A 1 146 070) or with sodium silicate (WO 2007/023118).

DE-A 21 65 912 describes a process for producing foams by foaming aqueous silicate solutions together with acid-donating curing agents, using volatile organic blowing agents, and curing the foams. The density of the open-cell foams varies between 20 and 900 g/l.

DE-A 32 44 523 describes the production of in situ foams, where an alkali metal silicate solution is mixed under pressure with a curing agent solution and a liquid blowing gas. Curing agents used are acid-donating carboxylic esters.

U.S. Pat. No. 3,737,332 describes a closed-cell foam of high density which can be obtained by blowing air into an alumina slurry and then carrying out drying and calcining at temperatures in the range from 540 to 1500° C. The closed cell character is achieved through the stabilization of the alumina slurry with fatty acid amides. High-temperature calcining follows in order to fix the alumina particles in the cell walls and to make the foam more stable.

The aforementioned inorganic, silicate-based foams are naturally of low flammability. In general, however, they have a relatively high density and brittleness.

WO 03/018476 describes an elastic inorganic foam which has a density of less than 25 kg/m$^3$ and is based on an aluminosilicate having an SiO2:Al$_2$O$_3$ molar ratio of 20:1 to 1:1. The high salt content leads to chain termination reactions in the course of production, and the mechanical stability is still not sufficient, however. The breaking extension for the foam is below 1%.

WO 2007/048729 describes a low-sodium silicate foam having a density of less than 25 kg/m$^3$ and intended for thermal or acoustic insulation. The open-cell foam is obtained by mixing a dispersion of SiO$_2$ particles which have an average diameter in the range from 1 to 100 nm with a surfactant and with a blowing agent at temperatures below 50° C., and foaming the mixture by heating to a temperature in the range from 60 to 100° C. or by depressurization. The mechanical stability of the foam is produced by a sintering operation at temperatures above 200° C.

In European patent application 07106945.4, unpublished at present, it is proposed that colloidal SiO$_2$ particles be subjected to partial hydrolysis with alkali metal hydroxide for the purpose of enhancing the foamability.

Inorganic flexible foams of low density are of interest for numerous applications on account of their high temperature stability, incombustibility, and low volatile fractions. For many applications, however, the foams proposed to date still do not exhibit the desired elasticity.

DE 10 2004 006 563 A1 describes a process for producing organic-inorganic hybrid foams by foaming an amorphous aluminosilicate with a surfactant, with addition of an organic silicon compound, and curing the foam using an alkali metal silicate solution as a curing agent for the aluminosilicate. Foaming agents used are peroxides or aluminum. The hybrid foams are said to exhibit reduced water absorption, increased abrasion resistance, and improved sound absorption.

WO 2008/007187 describes a hybrid material comprising a foamed polymer, more particularly polyurethane, and an inorganic binder such as gypsum or cement, and possessing good thermal and acoustic insulation effects, water vapor permeability, good fire behavior, and effective adhesion to concrete and mortar.

The object of the invention, then, was to provide an incombustible foam which as well as good thermal and acoustic insulation properties features improved elasticity and is therefore easy to handle and to process. A further intention was that the process for producing the foam should permit sufficient mechanical strength even without an energy-intensive sintering step.

Found accordingly has been a process for producing a silicate foam by foaming a mixture comprising 1% to 90%, preferably 10% to 80, more preferably 40% to 70%, by weight of an aqueous dispersion A) of SiO$_2$ particles which have an average particle diameter in the range from 1 to 100 nm, 1% to 45%, preferably 5% to 30%, more preferably 10% to 20%, by weight of a polymer B) in solution in water, 5% to 50% preferably 10% to 50%, more preferably 20% to 35%, by weight of a blowing agent C), 1% to 5%, preferably 2% to 3%, by weight of an emulsifier D), 0.01% to 5%, preferably 0.1% to 1%, by weight of a crosslinker E) which is reactive with the polymer B).

The weight percentages of the components A) and B) dissolved or dispersed in water are based on the solids of these components.

One preferred process for producing the silicate foam of the invention comprises the following stages:

(a) mixing an aqueous dispersion of SiO$_2$ particles A) which have an average particle diameter in the range from 1 to 100 nm with an aqueous solution of the polymer B),
(b) adding a blowing agent C) and an emulsifier D),
(c) adding a crosslinker E) which is reactive with the polymer B),
(d) foaming the mixture obtained from stage (c) by heating to a temperature in the range from 35 to 100° C. or by depressurization.

As an aqueous dispersion of SiO$_2$ particles A) it is preferred to use an aqueous, colloidal dispersion of SiO$_2$ particles with surface hydroxylation. The average diameter of the SiO$_2$ particles is situated in the range from 1 to 100 nm, preferably in the range from 10 to 50 nm. The specific surface area of the SiO2 particles is generally in the range from 10 to 3000 m$^2$/g, preferably in the range from 30 to 1000 m$^2$/g.

The solids content of commercial SiO$_2$ particle dispersions is dependent on the particle size and is situated in general in the range from 10% to 60%, preferably in the range from 30% to 50%, by weight. Aqueous, colloidal SiO$_2$ particle dispersions can be obtained by neutralizing dilute sodium silicates with acids, ion exchange, hydrolysis of silicon compounds such as alkoxysilanes, for example, dispersion of fumed silicate, or gel precipitation.

The polymer B) is soluble in water and is used in the form of an aqueous solution, preferably in a concentration of at least 50 g/l, more particularly at least 100 g/l. As polymer B) it is preferred to use an amino-functionalized polymer, more particularly a polyvinylamine.

Preferred blowing agents C) are volatile organic compounds, such as hydrocarbons, halogenated hydrocarbons, alcohols, ethers, ketones, and esters, for example. Particular preference is given to $C_4$-$C_8$ hydrocarbons, more particularly butane, pentane or hexane. The blowing agents are used preferably in amounts of 1% to 40%, more particularly 5% to 25%, by weight, based on the solids.

To emulsify the blowing agent and to stabilize the foam it is necessary to add an emulsifier or an emulsifier mixture D). As emulsifier D) it is possible to use anionic, cationic, nonionic or amphoteric surfactants.

Suitable anionic surfactants are diphenylene oxide sulfonates, alkane- and alkylbenzenesulfonates, alkylnaphthalenesulfonates, olefinsulfonates, alkyl ether sulfonates, alkyl sulfates, alkyl ether sulfates, alpha-sulfo fatty acid esters, acylaminoalkanesulfonates, acylisethionates, alkyl ether carboxylates, N-acylsarcosinates, alkylphosphates, and alkyl ether phosphates. Nonionic surfactants which can be used include alkylphenol polyglycol ethers, fatty alcohol polyglycol ethers, fatty acid polyglycol ethers, fatty acid alkanolamides, EO/PO block copolymers, amine oxides, glycerol fatty acid esters, sorbitan esters, and alkylpolyglucosides. Cationic surfactants employed include alkyltriammonium salts, alkylbenzyldimethylammonium salts, and alkylpyridinium salts. The emulsifiers are added preferably in amounts of 0.1% to 5% by weight, based on the $SiO_2$ particles.

Suitable crosslinkers E) include all compounds which are reactive with the water-soluble polymer B). The water-soluble polymer B) and the crosslinker E) are preferably selected such that the reaction time at the foaming temperature through to complete conversion is situated in the range from 1 to 30 seconds.

Preferred crosslinkers E) used are aldehydes, isocyanates, epoxides, acrylates, acrylamides, esters, divinylsulfonates, more preferably ethanedial.

For good fire protection, the fraction of organic constituents in the inorganic-organic hybrid foam ought to be as low as possible. The sum of the solids fractions of the water-soluble polymer B) and of the crosslinker E) is therefore preferably in the range from 1% to 30% by weight, more preferably in the range from 5% to 25% by weight, based on the silicate foam.

The mixture for foaming may further comprise typical additives, such as pigments and fillers, for example. Examples of suitable fillers include clay minerals, such as kaolin, silicates, such as aluminum silicate, sulfates such as calcium sulfate, or fibrous fillers, such as glass wool or mineral wool. In order to color the silicate structure it is possible to use, for example, metal oxides, such as those of iron, copper, chromium, manganese, cobalt, nickel, selenium or the rare earth metals. To improve the thermal insulation effect it is possible to add IR absorbers and/or reflectors, examples being cerium compounds. The addition of boron oxide, borates, phosphates or aluminum oxides may be carried out in order to optimize the thermal, electrical or mechanical properties of the silicate structure.

For improved foamability it is possible to add viscosity enhancer additives, examples being starch or modified celluloses.

The blowing agent is dispersed in the mixture in stage (b) preferably at temperatures below 50° C., more preferably at temperatures in the range from 10 to 30° C.

The foaming of the mixture obtained from stage (c) may take place in stage (d) by heating to a temperature in the range from 35 to 100° C., preferably in the range from 60 to 90° C. The heating or warming may be carried out by typical methods, such as with a heating oven, hot air or microwave, for example. The microwave is preferred since it permits particularly homogeneous and rapid heating or warming.

In another embodiment the mixture is foamed in stage (d) by depressurization. This results in an expansion of the blowing agent, and a solid foam is likewise formed. The reduction in pressure also includes the mixture, under a pressure P1, being depressurized through a nozzle to a pressure P2<P1, with P1>1 bar. In the case of these embodiments, heating for the purpose of foaming is not absolutely necessary.

In order to improve the mechanical stability it is possible to treat the foam with a solution of alkoxysilanes.

To increase the mechanical stability the foam after stage (d) can be dried at 100 to 140° C. and in a subsequent stage (e) can be sintered at a temperature above 500° C., preferably in the 550-800° C. range. Owing to the use of the water-soluble polymer B) and the crosslinker E) as organic components, the resulting foam need not necessarily be sintered. The foam is distinguished by a high elasticity, a breaking extension of more than 5%, and compliance with the A2 fire test of DIN 4102.

Subsequent to stage (e), the elastic inorganic foam obtained may be impregnated with a size of the kind typical for glass fibers, comprising silanes, for example. This aftertreatment may lead to an improvement in mechanical stability through a lowering of the sensitivity to notched impact. The impregnation may also be carried out with an increased concentration of the crosslinker. Postcrosslinking may increase the mechanical stability and reduce the swellability.

An aftertreatment may also be used in order to impart water repellency to the foam. In this case it is preferred to use hydrophobic coating materials which have a high temperature stability and a low combustibility, such as silicones, siliconates or fluorinated compounds, for example.

The process described produces foam blocks or foam slabs which can be cut to any desired shapes.

The density of the foam is generally 10 to 1000 kg/m³, preferably less than 100 kg/m³, and more preferably is situated in the range from 5 to 50 kg/m³.

The foam obtainable by the process of the invention preferably has an open-cell structure with a proportion of open cells, as measured in accordance with DIN ISO 4590, of more than 50%, in particular more than 80%.

The average pore diameter is preferably in the range from 10 to 1000 μm, more particularly in the range from 50 to 500 μm.

The melting point or softening point of the foam of the invention is below 1600° C., preferably in the range from 700 to 800° C. Mechanically stable silicate foams with a high melting point or softening point can be obtained by starting from a colloidal, aqueous dispersion of small, solid silicon dioxide particles.

The foam obtainable by the process of the invention can be used in a variety of ways for thermal and acoustic insulation in construction and in automotive engineering, such as, for example, for thermal insulation in homebuilding or as acoustic insulation material, in the engine compartment, in automobiles, aircraft, trains, ships, etc. Fields of application are situated preferably in areas which require a high temperature stability and low flammability, such as in pore burners, for example. The material is also suitable for insulation in areas that are subject to strong radiation that in the long term decomposes organic materials, such as in nuclear power stations, for example.

Furthermore, the foam obtainable by the process of the invention is also suitable in applications which use open-cell amino resin foam, such as for flame-retardant textiles, upholstery, mattresses, filters, and catalyst supports, for example. It has a low-temperature elasticity which is comparable with that of open-cell amino resin foams. As a polishing agent it is distinguished by a relatively high hardness and abrasiveness for very hard surfaces.

EXAMPLE 1

25 g of an aqueous dispersion of colloidal silicon dioxide (average particle diameter 30 nm, solids content 45% by weight) were admixed with 30 g of an aqueous polymer solution based on vinylamine and N-vinylformamide (solids content 10% by weight). Thereafter, 0.55 g of a nonionic surfactant based on alkylpolyglucoside was dissolved and 6 g of pentane were dispersed by intense stirring. Subsequently 0.03 g of ethanedial was added. Heating in a microwave oven at approximately 80° C. produced a foam block. After subsequent drying at 100° C., the foam had a density of 50 g/l and exhibited high mechanical strength and breaking extension.

EXAMPLE 2

35 g of an aqueous dispersion of colloidal silicon dioxide (average particle diameter 30 nm, solids content 45% by weight) were admixed with 30 g of an aqueous polymer solution based on vinylamine and N-vinylformamide (solids content 10% by weight) and 5 g of aluminum silicate. Thereafter, 0.55 g of a nonionic surfactant based on alkylpolyglucoside was dissolved and 6 g of pentane were dispersed by intense stirring. Subsequently 0.03 g of ethanedial was added. Heating in a microwave oven at approximately 80° C. produced a foam block. After subsequent drying at 100° C., the foam had a density of 40 g/l.

The invention claimed is:

1. A process for producing a silicate foam by foaming a mixture comprising
   40% to 70% by weight of an aqueous dispersion of $SiO_2$ particles A) which have an average particle diameter in the range from 1 to 100 nm,
   1% to 45% by weight of an amino-functionalized polymer B) in solution in water,
   5% to 50% by weight of a blowing agent C),
   1% to 5% by weight of an emulsifier D),
   0.01% to 5% by weight of a crosslinker E) which is reactive with the polymer B),
   the weight percentages of the components A) and B) being based on solids, and the sum of A) to E) making 100% by weight.

2. The process according to claim 1, which consists essentially of the following stages:

(a) mixing an aqueous dispersion of $SiO_2$ particles A) which have an average particle diameter in the range from 1 to 100 nm with an aqueous solution of the polymer B), (b) adding a blowing agent C) and an emulsifier D) and dispersing the blowing agent, (c) adding a crosslinker E) which is reactive with the polymer B), (d) foaming the mixture obtained from stage (c) by heating to a temperature in the range from 35 to 100° C. or by depressurization.

3. The process according to claim 1, wherein a polyvinylamine is used as amino-functionalized polymer.

4. The process according to claim 1, wherein an alkylpolyglucoside, alkyl ether sulfate or alkyl ether phosphate is used as emulsifier D).

5. The process according to claim 1, wherein a $C_4$-$C_8$ hydrocarbon is used as blowing agent C).

6. The process according to claim 1, wherein a dialdehyde is used as crosslinker E).

7. The process according to claim 1, wherein the aqueous dispersion of $SiO_2$ particles A) is admixed with starch or modified cellulose.

8. The process according to claim 1, wherein the sum of the solids fractions of polymer B) and of crosslinker E) is in the range from 1% to 30% by weight, based on the silicate foam.

9. A silicate foam obtainable by a process according to claim 1, which has a density in the range from 5 to 50 kg/m$^3$.

10. The silicate foam according to claim 9, which has a proportion of open cells in accordance with DIN ISO 4589 of more than 50%.

11. The use of the foam according to claim 9 for thermal or acoustic insulation.

12. The use of the foam according to claim 9 for cleaning purposes or for polishing.

13. The process according to claim 2, wherein a polyvinylamine is used as amino-functionalized polymer.

14. The process according to claim 2, wherein an alkylpolyglucoside, alkyl ether sulfate or alkyl ether phosphate is used as emulsifier D).

15. The process according to claim 3, wherein an alkylpolyglucoside, alkyl ether sulfate or alkyl ether phosphate is used as emulsifier D).

16. The process according to claim 2, wherein a $C_4$-$C_8$ hydrocarbon is used as blowing agent C).

17. The process according to claim 3, wherein a $C_4$-$C_8$ hydrocarbon is used as blowing agent C).

18. The process according to claim 4, wherein a $C_4$-$C_8$ hydrocarbon is used as blowing agent C).

19. The process according to claim 2, wherein a dialdehyde is used as crosslinker E).

20. The process according to claim 3 wherein a dialdehyde is used as crosslinker E).

21. The process according to claim 1, wherein the silicate foam has a density in the range from 5 to 50 kg/m$^3$.

* * * * *